United States Patent
Richards et al.

(10) Patent No.: US 10,317,680 B1
(45) Date of Patent: Jun. 11, 2019

(54) OPTICAL ABERRATION CORRECTION BASED ON USER EYE POSITION IN HEAD MOUNTED DISPLAYS

(71) Applicant: Facebook Technologies, LLC, Menlo Park, CA (US)

(72) Inventors: Evan M. Richards, Santa Clara, CA (US); Youngshik Yoon, Cupertino, CA (US); Shizhe Shen, San Mateo, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/808,572

(22) Filed: Nov. 9, 2017

(51) Int. Cl.
  *G02B 27/01* (2006.01)
(52) U.S. Cl.
  CPC .. *G02B 27/0172* (2013.01); *G02B 2027/0187* (2013.01)
(58) Field of Classification Search
  CPC ............. G02B 27/017; G02B 27/0172; G02B 27/0176; G02B 2027/011; G06F 3/013; G06F 3/012
  USPC ............................................................. 345/8
  See application file for complete search history.

(56) References Cited

U.S. PATENT DOCUMENTS

| | | | | |
|---|---|---|---|---|
| 2010/0091027 A1* | 4/2010 | Oyama | ............... | G02B 27/0068 345/581 |
| 2011/0234475 A1* | 9/2011 | Endo | .................... | G02B 27/017 345/8 |
| 2014/0078023 A1* | 3/2014 | Ikeda | ................. | G02B 27/0025 345/8 |
| 2016/0210782 A1* | 7/2016 | Thomas | ................ | G06T 19/006 |
| 2018/0114298 A1* | 4/2018 | Malaika | .................. | G06T 5/006 |

* cited by examiner

*Primary Examiner* — Koosha Sharifi-Tafreshi
(74) *Attorney, Agent, or Firm* — Fenwick & West LLP (57) ABSTRACT

An auto-focus head-mounted display (HMD) dynamically generates aberration-adjusted images based on the position and/or orientation of an eye of the user. An aberration-adjusted image is an image distorted to correct aberrations that would otherwise occur at a retina of the user due to image light passing through optics of the HMD that contains one or more optical imperfections. The aberration-adjusted image corrects the aberrations caused by these optical imperfections so that the resulting retinal image is free of optical aberrations due to the HMD while preserving correct eye optical aberrations that correlate with a current accommodative state of the eye.

18 Claims, 3 Drawing Sheets

OPTICAL ABERRATION CORRECTION BASED ON USER EYE POSITION IN HEAD MOUNTED DISPLAYS

BACKGROUND

The present disclosure generally relates to enhancing images from electronic displays, and specifically to generate aberration-corrected images based in part on a determined position and/or orientation of an eye of a user.

A head-mounted displays (HMD) can be used to simulate virtual environments. HMDs include optics that may introduce aberrations into the images presented to the user. Aberrations and distortion exist in optical systems as a result of lens imperfections. Conventional HMDs are often unable to fully compensate for aberrations introduced by the optics when rendering content.

SUMMARY

An auto-focus head-mounted display (HMD) dynamically generates aberration-adjusted images based on the position and/or orientation of user's eye(s). An aberration-adjusted image is an image distorted to correct aberrations that would otherwise occur at a retina of the user due to light of the image passing through optics of the HMD. The aberration-adjusted image corrects the aberrations of the HMD while preserving correct eye optical aberrations that correlate with a current position, orientation, and/or accommodative state of the eye. The HMD includes an eye tracking system, a rendering module, and, in some embodiments, a varifocal system (i.e., a system that mechanically changes a distance between a lens system and screen that can be electrically activated to change the optical depth of the presented image, changes shape of one or more lenses in the lens system, etc.).

As mentioned above, optical aberrations and distortion exist in optical systems as a result of lens imperfections. Lens imperfections of the optics block cause light from the electronic display to be distorted as the light passes through the optics block. Accordingly, since optical aberrations change as a function of viewing angle (e.g., relative to an optical axis of the optics block through which a user views the virtual scene), the HMD determines a position of the eye (e.g., eye orientation, etc.) for each eye of the user along with the corresponding optical aberration information associated with that determined position. The optical aberration information, in one embodiment, is determined ahead of time and mapped to an optical correction stored by the HMD (or system in communication with the HMD) for a number of eye position and/or viewing angles. The optical aberration information for a particular viewing angle can alternatively be determined in real-time based on known characteristics of the HMD's optics block, a distance between the user's eyes and the optics block, and so forth. There may also be situations where optical corrections are stored for the most common viewing and optical corrections for less common viewing angles are determined in real-time.

Accordingly, the optical correction for the determined optical aberration information at the determined viewing angle corresponds to displaying the one or more frames of the virtual scene on the electronic display with pre-distortion that is canceled by the one or more optical imperfections of the optics block as light for the one or more frames of the virtual scene passes through the optics block. Thus, the pre-distorted virtual scene image is corrected for the determined viewing angle by the lens imperfections of the optics block to arrive at each eye of the user substantially free of unintended optical aberrations or distortion.

In another embodiment, for each frame of content (e.g., a virtual scene, etc.), the HMD determines the position of the eye (e.g., eye orientation, viewing angle, etc.) for each eye of the user and additionally determines a location where the user's eyes find accommodation (e.g., eye focus position/distance, etc.) based on the eye position for each eye of the user. Since optical aberrations change based on the user's viewing angle relative to the optical axis of the optics block and where the user's eyes find accommodation, optical aberration information is determined as above for the determined eye position of each eye of the user and additionally for accommodation information of the optics block. Accordingly, based on accommodation information (e.g., eye focus position/distance, etc.) and the determined optical aberration information for the determined eye position of the user, a focus state for the optics block is determined. The focus state corresponds to a unique combination of an eye position/viewing angle and accommodation information and includes information for pre-distorting the image of the virtual scene such that the optical error introduced by the optics block cancels the pre-distortion, thereby, resulting in an aberration corrected image of the virtual scene. Accordingly, the HMD tracks the eyes of the user to an updated position for each additional image and updates the focus state for the updated position.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 1:
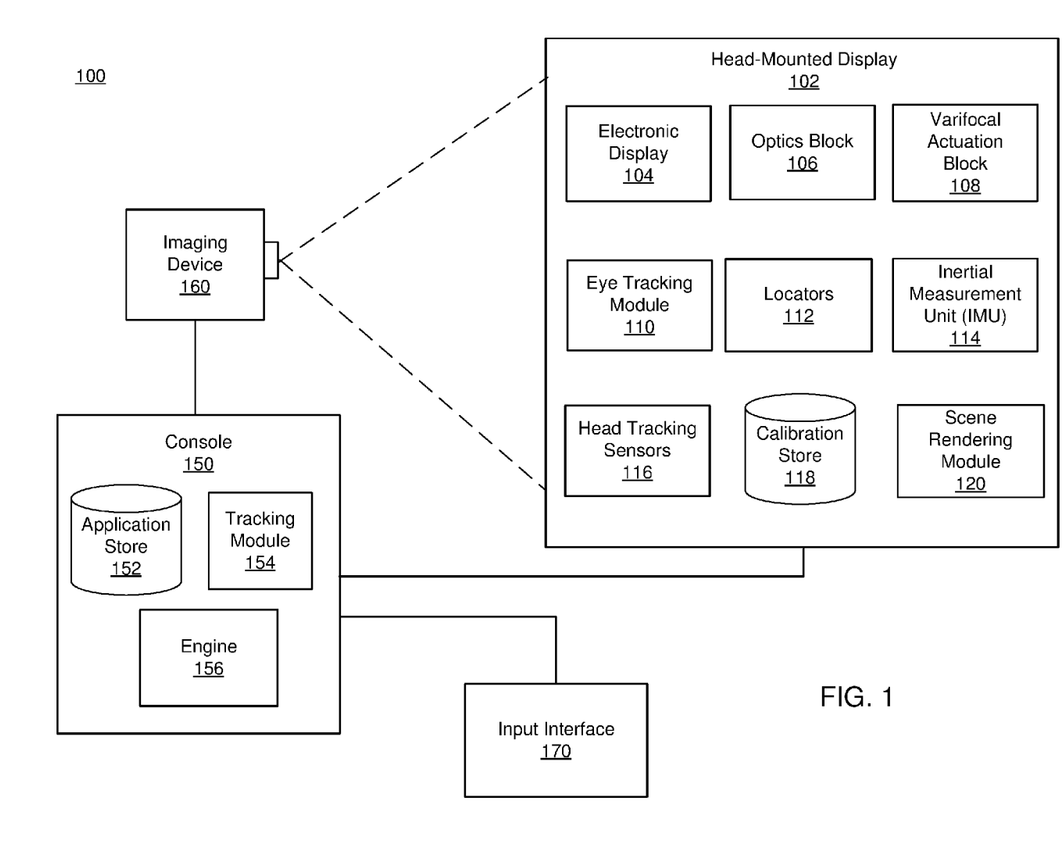
FIG. 1 shows an example system environment in which a head-mounted display operates, in accordance with at least one embodiment.

FIG. 1 shows system 100, in accordance with at least one embodiment. In this example, system 100 includes an HMD 102, imaging device 160, and input interface 170, which are each coupled to console 150. While FIG. 1 shows a single HMD 102, a single imaging device 160, and a single input interface 170, in other embodiments, any number of these components may be included in the system. For example, there may be multiple HMDs 100 each having an associated input interface 170 and being monitored by one or more imaging devices 160, with each HMD 102, input interface 170, and imaging devices 160 communicating with the console 150. In alternative configurations, different and/or additional components may also be included in the system 100.

The HMD 102 is a Head-Mounted Display that presents content to a user. Example content includes images, video, audio, or some combination thereof. Audio content may be presented via a separate device (e.g., speakers and/or headphones) external to the HMD 102 that receives audio information from the HMD 102, the console 150, or both. Some embodiments of the HMD 102 have different modules than those described here. Similarly, the functions can be distributed among the modules in a different manner than is described here. In some embodiments, the HMD 102 may also act as an augmented reality (AR) and/or mixed reality (MR) headset. For example, when the HMD 102 acts as an AR headset, the HMD 102 augments views and of a physical, real-world environment with computer-generated elements (e.g., images, video, sound, etc.).

The HMD 102 includes an electronic display 104, an optics block 106, a varifocal actuation block 108, an eye tracking module 110, one or more locators 112, an internal measurement unit (IMU) 114, a head tracking sensors 116, a calibration store 118, and a scene rendering module 120.

The optics block 106 directs light from the electronic display 104 to an exit pupil for viewing by a user using one or more optical elements, such as apertures, Fresnel lenses, convex lenses, concave lenses, reflecting surfaces, filters, and so forth, and may include combinations of different optical elements. In some embodiments, one or more optical elements in optics block 106 may have one or more coatings, such as anti-reflective coatings. Magnification of the image light by the optics block 106 allows the electronic display 104 to be physically smaller, weigh less, and consume less power than larger displays. Additionally, magnification of the image light may increase a field of view of the displayed content. For example, the field of view of the displayed content is such that the displayed content is presented using almost all (e.g., 150 degrees diagonal), and in some cases all, of the user's field of view.

The optics block 106 may be designed to correct optical error, such as two dimensional optical errors, three dimensional optical errors, or some combination thereof. Example types of two dimensional errors include: barrel distortion, pincushion distortion, longitudinal chromatic aberration, transverse chromatic aberration, or any other type of two-dimensional optical error. Three dimensional errors are optical errors that occur in three dimensions. Example types of three dimensional errors include spherical aberration, comatic aberration, field curvature, astigmatism, or any other type of three-dimensional optical error. In some embodiments, content provided to electronic display 104 for display is pre-distorted, and optics block 106 corrects the distortion when it receives image light from electronic display 104 generated based on the content.

The varifocal actuation block 108 includes a varifocal element that causes the optics block 106 to vary the focal length (or optical power) or apparent back focal length (principal plane location of the optics relative to the electronic display 104) of the HMD 102. By varying the focal length of the optics block 103, the varifocal actuation block 108 changes a focus state of the optics block 106. In some embodiments, the varifocal actuation block 108 physically changes the distance between the electronic display 104 and the optics block 106 by moving the electronic display 104, the optics block 106, one or more optical elements within the optics block 106, or some combination thereof. Alternatively, the varifocal actuation block 108 changes the shape or optical power of one or more lenses in the optics block 106. For example, the varifocal actuation block 108 changes the optical power or shape of the one or more lenses using shape-changing polymer lenses, electrowetting methods with liquid lenses, Alvarez-Lohmann lenses, deformable membrane mirrors, liquid crystal (electroactive) lenses, or phase-only spatial light modulators (SLMs), or any other suitable component. Additionally, moving or translating two lenses relative to each other may also be used to change the focal length of HMD 102. Thus, the varifocal actuation block 108 may include actuators or motors that move the electronic display 104 and/or the optics block 106 on a track to change the distance between them or may include actuators and other components or mechanisms for changing the shape of one or more lenses included in the optics block 106. The varifocal actuation block 108 may include a focus state estimator (via encoder or other means), which allows the current position of the varifocal system to be determined and/or future focus state to be predicted based on current and past state history. The varifocal actuation block 108 may be separate from or integrated into optics block 106 in various embodiments. HMDs including varifocal elements are further described in U.S. patent application Ser. No. 14/963,109, filed on Dec. 8, 2015, which is hereby incorporated by reference in its entirety.

Eye tracking module 110 tracks an eye position and eye movement of a user of HMD 102 to determine the viewing angle through which the user views content presented by the electronic display 102 through optics block 106. A camera or other optical sensor inside HMD 102 captures image information of a user's eyes, and eye tracking module 110 uses the captured information to determine eye information, such as the interpupillary distance, interocular distance, a three-dimensional (3D) position of each eye relative to HMD 102 (e.g., for distortion adjustment purposes), including a magnitude of torsion and rotation (i.e., roll, pitch, and yaw) and gaze direction for each eye. In one example, infrared light is emitted within VR HMD 102 and reflected from each eye. The reflected light is received or detected by the camera and analyzed to extract eye rotation from changes in the infrared light reflected by each eye. Eye tracking systems are further described in U.S. patent application Ser. No. 15/344,430, filed on May 11, 2017, which is hereby incorporated by reference in its entirety.

Accordingly, eye tracking module 110 may track up to six degrees of freedom of each eye (i.e., 3D position, roll, pitch, and yaw) and at least a subset of the tracked quantities may be combined from two eyes of a user to estimate a gaze point (i.e., a 3D location or position in the virtual scene where the user is looking). For example, eye tracking module 110 integrates information from past measurements, measurements identifying a position of a user's head, and 3D information describing a scene presented by electronic display 102. Thus, information for the position and orientation of the user's eyes is used to determine the gaze point in a virtual scene presented by HMD 102 corresponding to where the user is looking within the virtual scene.

The locators 112 are objects located in specific positions on the HMD 102 relative to one another and relative to a specific reference point on the HMD 102. A locator 114 may be a light emitting diode (LED), a corner cube reflector, a reflective marker, a type of light source that contrasts with an environment in which the HMD 102 operates, or some combination thereof. Active locators 112 (i.e., an LED or other type of light emitting device) may emit light in the visible band (~380 nm to 750 nm), in the infrared (IR) band (~750 nm to 14,000 nm), in the ultraviolet band (10 nm to 380 nm), some other portion of the electromagnetic spectrum, or some combination thereof. Additionally, in some embodiments, the locators 112 may include light sensors (e.g., photo-diodes, cameras, etc.).

The locators 112 can be located beneath an outer surface of the HMD 102, which is transparent to the wavelengths of light emitted or reflected by locators 112 or is thin enough not to substantially attenuate the wavelengths of light emitted or reflected by the locators 112. Further, the outer surface or other portions of the HMD 102 can be opaque in the visible band of wavelengths of light. Thus, the locators 112 may emit light in the IR band while under an outer surface of the HMD 102 that is transparent in the IR band but opaque in the visible band.

The IMU 114 is an electronic device that generates fast calibration data based on measurement signals received from one or more of the head tracking sensors 116, which generate one or more measurement signals in response to motion of the HMD 102. Examples of the head tracking sensors 116 include accelerometers, gyroscopes, magnetometers, other sensors suitable for detecting motion, correcting error associated with the IMU 114, or some combination thereof. The head tracking sensors 116 may be located external to the IMU 114, internal to the IMU 114, or some combination thereof.

Based on the measurement signals from the head tracking sensors 116, the IMU 114 generates fast calibration data indicating an estimated position of the HMD 102 relative to an initial position of the HMD 102. For example, the head tracking sensors 116 include multiple accelerometers to measure translational motion (forward/back, up/down, left/right) and multiple gyroscopes to measure rotational motion (e.g., pitch, yaw, roll). The IMU 114 can, for example, rapidly sample the measurement signals and calculate the estimated position of the HMD 102 from the sampled data. For example, the IMU 114 integrates measurement signals received from the accelerometers over time to estimate a velocity vector and integrates the velocity vector over time to determine an estimated position of a reference point on the HMD 102. The reference point is a point that may be used to describe the position of the HMD 102. While the reference point may generally be defined as a point in space, in various embodiments, reference point is defined as a point within the HMD 102 (e.g., a center of the IMU 130). Alternatively, the IMU 114 provides the sampled measurement signals to the console 150, which determines the fast calibration data.

The IMU 114 can additionally receive one or more calibration parameters from the console 150. As further discussed below, the one or more calibration parameters are used to maintain tracking of the HMD 102. Based on a received calibration parameter, the IMU 114 may adjust one or more IMU parameters (e.g., sample rate). In some embodiments, certain calibration parameters cause the IMU 114 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

The calibration store 118 is a data store that maintains calibration information. The calibration information, in one embodiment is information that maps particular optical aberration information (also referred to as aberration information) to at least one eye position or viewing angle (and potentially to specific amounts of eye accommodation) and the optical aberration information is potentially different for each different eye position or different viewing angle. Optical aberration information for a particular eye position or viewing angle may describe, e.g., barrel distortion, pincushion distortion, longitudinal chromatic aberration, transverse chromatic aberration, any other type of two-dimensional optical error, spherical aberration, comatic aberration, field curvature, astigmatism, any other type of three-dimensional optical error, or some combination thereof at that particular eye position or viewing angle. In one embodiment, the optical aberration information is specific to the optics block 106 and, therefore, each eye position or viewing angle is mapped to a predetermined optical correction. In another embodiment, the optical aberration information is additionally specific to optics of a user's eye (e.g., shape of the cornea), or it may describe the total optical error caused by both the optics block 106 and the optics of the user's eye. The calibration information may include data measured and/or stored for an individual user, representing characteristics (such as spherical aberration) for which there is wide variation from person to person, and this data may include a user's prescription for optical correction as well, allowing the device to be used without needing spectacles or contact lenses.

Alternatively, calibration store 118 stores details and characteristics of the optics block of HMD 102 that allows an optical correction to be determined in real-time based on a determined viewing angle or eye position. For example, the optical aberration information for a particular viewing angle can be determined in real-time based on the known characteristics of optics block 106, a distance between the user's eyes and the optics block, and so forth. Additionally, HMD 102 may only store a subset of all possible optical corrections (e.g., only the most common viewing angles and eye positions) and the optical corrections for less common viewing angles are determined in real-time based on the known characteristics of optics block 106 and a distance between the user's eyes and the optics block.

The scene rendering module 120 receives content for the virtual scene from the engine 156 and provides the content for display on the electronic display 104. Additionally, the scene rendering module 120 can adjust the content based on information from the eye tracking module 110, the calibration store 118, the IMU 114, varifocal actuation block 108, and the head tracking sensors 116. For example, upon receiving the content from the engine 156, the scene rendering module 120 adjusts the content by adding a pre-distortion into rendering of the virtual scene to compensate or correct for the distortion caused by the optics block 106 and/or eyes of the user. Based on the aberration information, the scene rendering module 120 can, in one embodiment, determine a focal position for the varifocal actuation block 108 and a pre-distortion to apply to the image for rendering. The scene rendering module 120 may then instruct the varifocal actuation block 108 to adjust focus to the determined focal position, and provides the electronic display 104 the pre-distorted image for rendering. In another embodiment, the scene rendering module 120 can provide the electronic display 104 with the pre-distorted image for rendering solely based on the viewing angle and/or position of the eye of the user for each eye.

The virtual scene is rendered to produce an aberration-adjusted image that, once displayed, passes through the optics of the HMD 102 and the user's eye, the image that lands on the retina is as close as possible to that which would have landed on the retina if the user were viewing an actual scene in a given accommodative state (including the effects of aberrations from defocus, which contain cues to accommodation) rather than a rendered image of one. In some embodiments, the scene rendering module 120 first renders (in memory) the virtual scene to approximate the image which would actually land on the retina in a real scene with the current accommodation state by incorporating the estimated aberrations (determined from the aberration information) into the rendering process. The scene rendering module 120 simulates aberrations such as distortion, lateral and/or longitudinal aberration, and so forth as the scene is being rendered. Once this desired retinal image has been produced, the scene rendering module 120 may perform an optimization step to generate a corresponding aberration-adjusted image which is then presented by the electronic display 104, so that when the aberration-adjusted image passes through the optics block 106 and the user's eye, a retinal image is as close to the desired retinal image as possible.

The imaging device 160 generates slow calibration data in accordance with calibration parameters received from the console 150. Slow calibration data includes one or more images showing observed positions of the locators 112 that are detectable by the imaging device 160. The imaging device 160 may include one or more cameras, one or more video cameras, other devices capable of capturing images including one or more the locators 112, or some combination thereof. Additionally, the imaging device 160 may include one or more filters (e.g., for increasing signal to noise ratio). The imaging device 160 is configured to detect light emitted or reflected from the locators 112 in a field of view of the imaging device 160. In embodiments where the locators 112 include passive elements (e.g., a retroreflector), the imaging device 160 may include a light source that illuminates some or all of the locators 112, which retro-reflect the light towards the light source in the imaging device 160. Slow calibration data is communicated from the imaging device 160 to the console 150, and the imaging device 160 receives one or more calibration parameters from the console 150 to adjust one or more imaging parameters (e.g., focal length, focus, frame rate, ISO, sensor temperature, shutter speed, aperture, etc.).

The input interface 170 is a device that allows a user to send action requests to the console 150. An action request is a request to perform a particular action. For example, an action request may be to start or end an application or to perform a particular action within the application. The input interface 170 may include one or more input devices. Example input devices include a keyboard, a mouse, a game controller, or any other suitable device for receiving action requests and communicating the received action requests to the console 150. An action request received by the input interface 170 is communicated to the console 150, which performs an action corresponding to the action request. In some embodiments, the input interface 170 may provide haptic feedback to the user in accordance with instructions received from the console 150. For example, haptic feedback is provided by the input interface 170 when an action request is received, or the console 150 communicates instructions to the input interface 170 causing the input interface 170 to generate haptic feedback when the console 150 performs an action.

The console 150 provides content to the HMD 102 for presentation to the user in accordance with information received from the imaging device 160, the HMD 102, or the input interface 170. In the example shown in FIG. 1, the console 150 includes the application store 152, the tracking module 154, and the engine 156. Some embodiments of the console 150 have different or additional modules than those described in conjunction with FIG. 1. Similarly, the functions further described below may be distributed among components of the console 150 in a different manner than is described here.

The application store 152 stores one or more applications for execution by the console 150. An application is a group of instructions, that when executed by a processor, generates content for presentation to the user. Content generated by an application may be in response to inputs received from the user via movement of the HMD 102 or the interface device 170. Examples of applications include gaming applications, conferencing applications, video playback application, or other suitable applications.

The tracking module 154 calibrates the system using one or more calibration parameters and may adjust one or more calibration parameters to reduce error in determining position of the HMD 102. For example, the tracking module 154 adjusts the focus of the imaging device 160 to obtain a more accurate position for observed the locators 112 on the HMD 102. Moreover, calibration performed by the tracking module 154 also accounts for information received from the IMU 114. Additionally, if tracking of the HMD 102 is lost (e.g., the imaging device 160 loses line of sight of at least a threshold number of the locators 112), the tracking module 154 re-calibrates some or all of the system 100 components.

Additionally, the tracking module 154 tracks the movement of the HMD 102 using slow calibration information from the imaging device 160 and determines positions of a reference point on the HMD 102 using observed locators from the slow calibration information and a model of the HMD 102. Tracking module 154 also determines positions of the reference point on the HMD 102 using position information from the fast calibration information from the IMU 114 on the HMD 102. Additionally, the tracking module 154 may use portions of the fast calibration information, the slow calibration information, or some combination thereof, to predict a future location of the HMD 102, which is provided to the engine 156.

The engine 156 executes applications within the system 100 and receives position information, acceleration information, velocity information, predicted future positions, or some combination thereof for the HMD 102 from the tracking module 154. Based on the received information, the engine 156 determines content to provide to the HMD 102 for presentation to the user, such as a virtual scene. For example, if the received information indicates that the user has looked to the left, the engine 156 generates content for the HMD 102 that mirrors or tracks the user's movement in a virtual environment. Additionally, the engine 156 performs an action within an application executing on the console 150 in response to an action request received from the input interface 170 and provides feedback to the user that the action was performed. The provided feedback may be visual or audible feedback via the HMD 102 or haptic feedback via the input interface 170.

Figure 2A:
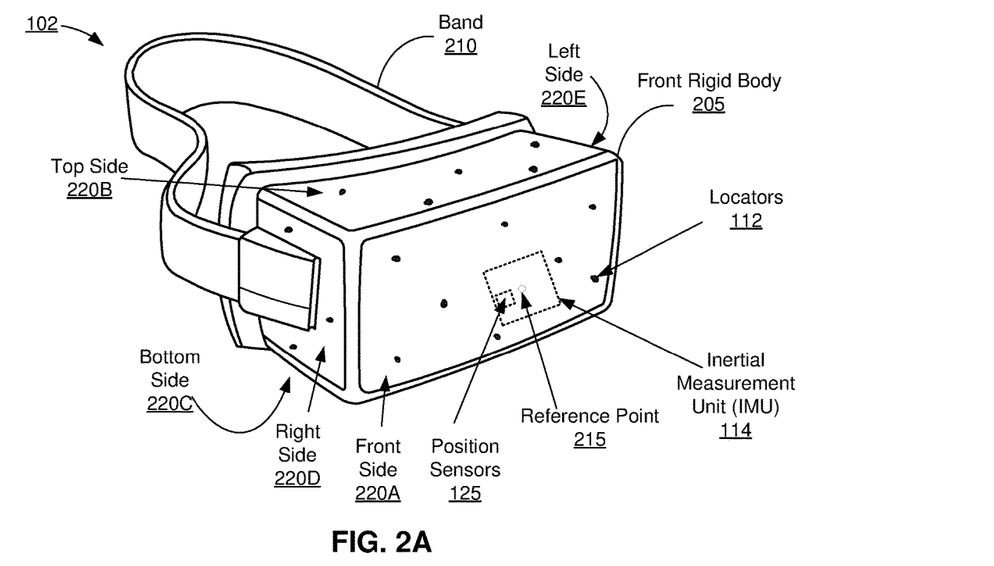
FIG. 2A is a diagram of a head-mounted display, in accordance with an embodiment.

FIG. 2A is a wire diagram of HMD 102, in accordance with an embodiment. The HMD 102 includes a front rigid body 205 and a band 210. The front rigid body 205 includes one or more electronic display (not shown), the IMU 114, the one or more position sensors 125, and the locators 112. In the embodiment shown by FIG. 2A, the position sensors 125 are located within the IMU 114, and neither the IMU 114 nor the position sensors 125 are visible to the user.

The locators 112 are located in fixed positions on the front rigid body 205 relative to one another and relative to a reference point 215. In the example of FIG. 2A, the reference point 215 is located at the center of the IMU 114. Each of the locators 112 emit light that is detectable by the imaging device 160. Locators 112, or portions of locators 112, are located on a front side 220A, a top side 220B, a bottom side 220C, a right side 220D, and a left side 220E of the front rigid body 205 in the example of FIG. 2A.

Figure 2B:
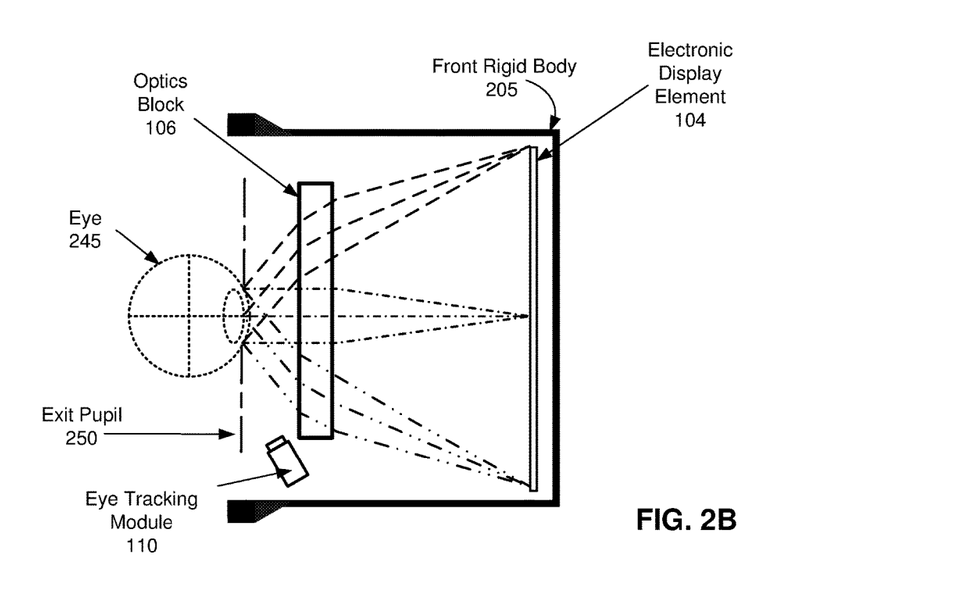
FIG. 2B is a cross-section view of a front rigid body of the head-mounted display in FIG. 2A, in accordance with an embodiment.

FIG. 2B is a cross section of the front rigid body 205 of the HMD 102 shown in FIG. 2A. As shown in FIG. 2B, the front rigid body 205 includes the electronic display 104, an optics block 106, and an eye tracking module 110. The electronic display 104 emits pre-distorted light toward the optics block 106. The pre-distorted light is then undistorted or corrected by distortion introduced by or inherent to optics block 106 to allow the light to arrive at the user's eye 245 essential free of any unintentional distortion that could detract from the illusion being created for the user by the virtual scene.

The eye tracking module 110 includes a camera or other sensor that tracks an eye position and eye movement of a user's eye 245 to determine the viewing angle through which the user views content presented by the electronic display 104 through optics block 106. As discussed in detail below with regard to FIG. 3, based on the eye position and/or viewing angle and measured accommodation, the image is be pre-distorted prior to rendering to mitigate optical aberrations that are introduced by the optics block 106, and in some embodiments, also reproduce optical aberrations introduced by an eye 245 of the user as a function of at least one of eye position, viewing angle, and/or accommodation distance.

The optics block 106 alters (e.g., magnifies) the received light and provides it to an exit pupil 250 for presentation to the user. Additionally, the optics block 106 may introduce aberrations into the image light. However, the pre-distortion in the image light mitigates the aberrations introduced by the optics block 106. Moreover, a focal length and/or back focal length spacing of the optics block 106 may be varied by the varifocal actuation block 108 (not shown for simplicity). For example, the varifocal actuation block 108 may adjust one or more optical elements within the optics block 106 to affect the focal length of the optics block 106. The adjusted focal length may help mitigate optical aberrations. In addition, the optics block 106 may be further adjusted to reduce or eliminate the need for prescription correction for users who might otherwise need to wear spectacles or contact lenses in the system. Light from the optics block 106 is directed to an exit pupil 250.

In some embodiments, the optics block 106 is designed to preserve the aberrations of the human eye (e.g. longitudinal chromatic aberration, which defocuses in some colors in traditional displays). This can be accomplished via techniques such as diffractive optics, through inducing an optical depth offset for each separate color channel across the display, by otherwise designing the optical system to place the image in focus on the retina across key wavelengths (e.g. the peaks of the display primaries), or some combination thereof. Accordingly, the pixel array may be imaged onto the retina with minimal aberration, allowing for more precise generation and control of image quality and cues such as accommodation to the visual system.

The exit pupil 250 is the location of the front rigid body 205 where a user's eye 245 is positioned. For purposes of illustration, FIG. 2B shows a cross section associated with a single eye 245, but another optics block, separate from the optics block 106, provides altered image light to another eye of the user.

Figure 3:
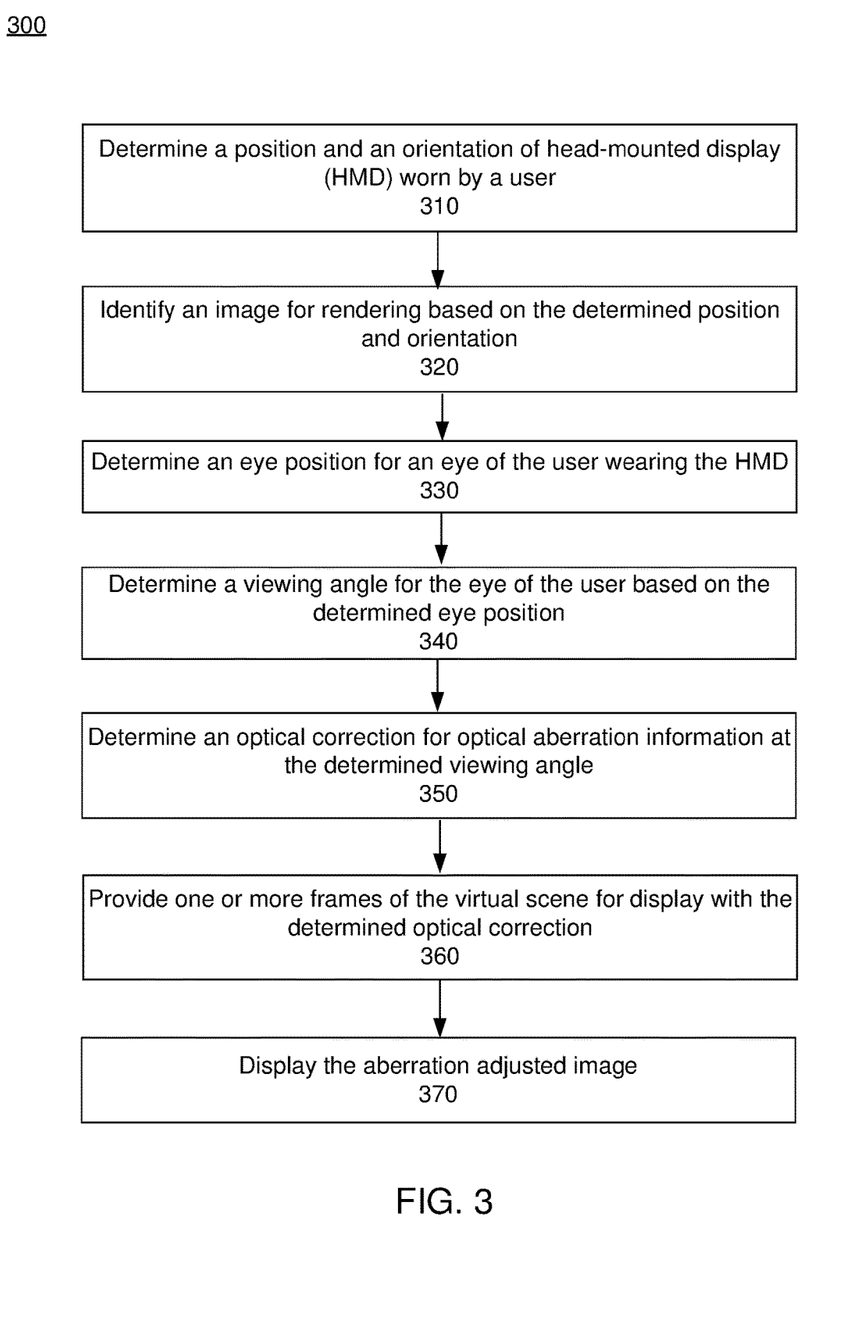
FIG. 3 is a process for generating aberration-adjusted images, in accordance with at least one embodiment.

FIG. 3 is a flowchart of a process 300 for generating aberration-adjusted images based on eye position of a user, in accordance with at least one embodiment. The process 300 may be performed by the system 100 in some embodiments. Alternatively, other components may perform some or all of the steps of the process 300 (e.g., the console 150 and/or the HMD 102). Additionally, the process 300 may include different or additional steps than those described in conjunction with FIG. 3 in some embodiments or perform steps in different orders than the order described in conjunction with FIG. 3.

The system 100 determines 310 a position and an orientation of the HMD 102 worn by a user. In the embodiment shown by FIG. 3, a position, an orientation, and/or a movement of HMD 102 are determined by a combination of the locators 112, the IMU 114, the head tracking sensors 116, the imagining device 160, and the tracking module 154, as described above in conjunction with FIG. 1. Portions of a virtual scene presented by the HMD 102 are mapped to various positions and orientations of the HMD 102. Thus, a portion of the virtual scene currently viewed by a user is determined based on the position, orientation, and movement of HMD 102.

The system 100 identifies 320 an image for rendering based on the determined position and orientation of the HMD 102. For example, given position and orientation information, the console 150 identifies what media (e.g., image, audio, etc.) that should be provided to the HMD 102 for presentation to the user.

HMD 102 determines 330 an eye position for each eye of the user wearing HMD 102 for one or more frames of the virtual scene. The eye tracking module 110 includes one or more imaging devices configured to capture eye tracking data, which the eye tracking module 110 uses to track the user's eye and to determine an eye's position, including orientation and location of the eye relative to the HMD 102.

Using the determined eye position, the HMD 102 determines 340 a viewing angle for the eye of the user. In general, the degree, magnitude, and/or general appearance/nature of optical aberrations changes based on how (corresponding to the viewing angle) the user looks through a lens. For example, pincushion and barrel distortion generally causes image magnification to increase and decrease, respectively, with distance from the optical axis. Thus, a user viewing content on HMD 102 while looking out of the corner of their eye (i.e., at a relatively extreme angle relative to the optical axis of optics block 106) will observe a greater amount of distortion relative to looking at content straight down (i.e., parallel to) the optical axis.

In order to generate optical corrections, the optical aberrations caused by imperfections in the optics block 106 are observed and recorded for each of at least a subset of possible viewing angles. This can be performed using a camera that is mechanically moved to observe the optical aberrations from a number of angles (and potentially extrapolating/estimating for values between) or can be performed using a ray tracing program with specifications of optics block 106. Additionally, in one embodiment, optical aberrations are observed and recorded for each focus state of the optics block 106 that includes a combination of focal length and viewing angle. An optical correction for each of these viewing angles or focus states is then generated to reverse or cancel the distortion observed at these viewing angles, applied to one or more frames of the virtual scene, and provided to electronic display 104 for display. Electronic display 104, thus, displays a pre-distorted image that is then complementarily distorted by the optical imperfections of optics block 106 to produce an image free of unintended distortion (or at least whose unintended distortion has been mitigated). Thus, while the same optical correction can and may be estimated for a range of different viewing angles (to save memory or processing time/resources, for example) there is a theoretically different optical correction for each viewing angle.

An optical correction of a plurality of optical corrections is determined 350 for the determined viewing angle of the user to correct the optical aberration associated with that determined viewing angle. In one embodiment, each viewing angle is mapped to a predetermined optical correction. Alternatively, the optical correction can be determined in real-time for each viewing angle. Thus, the optical correction corresponding to displaying the one or more frames of the virtual scene on the electronic display 104 with pre-distortion that is canceled by the one or more optical imperfections of the optics block 106 as light for the one or more frames of the virtual scene passes through the optics block 106.

Accordingly, the determined optical correction is applied to the one or more frames of the virtual scene and provided 360 for display to electronic display 104 for the determined optical aberration information at the determined viewing angle and determined eye position of the user wearing the HMD 102 and the electronic display 104 displays 370 the aberration adjusted image on the HMD 102.

As the viewing angle changes and the user looks in different directions, the optical correction must change and be updated to account for and correct the distortion at each new viewing angle. Thus, eye tracking module 110 continues to track each eye of the user to an updated position for an additional image of an additional frame of the virtual scene, for example. As eye tracking module 110 determines a change in viewing angle, the optical correction is updated for the optical aberration information for the updated viewing angle to update the pre-distortion that is applied or added to the virtual scene.

In a varifocal system, magnification of the optics block 106 is another variable in addition to the viewing angle that needs to be taken into account by the optical correction. For example, for the same viewing angle, distortion or other optical aberrations will be different for states of the optics block 106 with longer focal lengths relative to states with shorter focal lengths (since the user is essentially looking through a different portion of the lens when it is physically closer to their eye relative to when it is farther away). Thus, in a varifocal system, the optical correction must additionally account for the magnification being provided to the user by optics block 106 in addition to viewing angle.

Accordingly, in one embodiment, a gaze point corresponding to where in the virtual scene the user is looking is determined based at least in part on the determined viewing angle of the user. For example, using the eye position and interpupillary distance, the gaze point can be estimated using triangulation to determine vergence of the user's eyes. Using depth information for the virtual scene, a state for the optics block 106 is determined and the optical aberration information for the state is determined. As described above, the state of the optics block 106 corresponds to a combination of viewing angle and focus state of the optics block 106 and the focus state of the optics block 106 corresponds to the eye relief, magnification, or focal length that the optics block 106 is providing the user of HMD 102.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A head mounted display (HMD) comprising:
   a processor;
   an electronic display configured to display a virtual scene to a user wearing the HMD;
   an optics block configured to direct light from the electronic display to an exit pupil of the HMD;
   an eye tracking system configured to determine an eye position of an eye of the user wearing the HMD; and
   memory including instructions that, when executed by the processor, cause the processor to:
      determine, for one or more frames of the virtual scene, a viewing angle for the eye of the user based on the determined eye position;
      determine, for the determined viewing angle and the determined eye position, optical aberration information corresponding to one or more known optical aberrations caused by the optics block observable from the determined viewing angle at the determined eye position of the eye of the user, one or more optical imperfections of the optics block causing the one or more known optical aberrations as the light from the electronic display passes through the optics block to the exit pupil of the HMD;
      determine a gaze point of the user within the virtual scene based at least in part on the determined viewing angle and the determined eye position of the user;
      determine, using depth information for the virtual scene, a focus state for the optics block of a plurality of different possible focus states of the optics block based on the determined gaze point for the eye of the user and the optical aberration information for the determined viewing angle, the depth information for the virtual scene providing a focus depth corresponding to providing accommodation for the eye of the user, the focus state corresponding to a combination of the focus depth and viewing angle;
      determine an optical correction for the determined optical aberration information and the determined focus state for the optics block, at the determined viewing angle and determined eye position, the optical correction corresponding to the one or more frames of the virtual scene being displayed on the electronic display with pre-distortion that is canceled by the one or more optical imperfections of the optics block as light for the one or more frames of the virtual scene with the pre-distortion passes through the optics block; and
      provide, for the determined optical aberration information for the determined focus state of the optics block, at the determined viewing angle and the determined eye position of the user wearing the HMD, the one or more frames of the virtual scene for display with the determined optical correction.

2. The HMD of claim 1, further comprising:
   a varifocal actuation block configured to change a focal length of the optics block based at least in part on the gaze point for the user and, wherein the instructions that, when executed by the at least one processor, further cause the at least one processor to:
      adjust the focal length of the optics block based on the determined focus state using the varifocal actuation block, the focus state corresponding to a combination of the focus depth and viewing angle.

3. The HMD of claim 2, wherein each focus state of the plurality of different possible focus states of the optics block is mapped to an optical correction corresponding to the determined optical aberration information for that focus state of the optics block.

4. The HMD of claim 2, wherein adjusting the focal length of the optics block includes changing a distance between the optics block and the electronic display to provide the one or more frames of the virtual scene in focus to the user for the determined focus state.

5. The HMD of claim 1, wherein the instructions that, when executed by the at least one processor, further cause the at least one processor to:
   determine a position and orientation of the HMD worn by the user; and
   identify, for each of the one or more frames of the virtual scene, an image for rendering based on the determined position and orientation of the HMD.

6. The HMD of claim 1, wherein the one or more optical aberrations include at least one of field curvature or chromatic aberration.

7. A head mounted display (HMD) comprising:
   a processor;
   an electronic display configured to display a virtual scene to a user wearing the HMD;
   an optics block configured to direct light from the electronic display to an exit pupil of the HMD;
   an eye tracking system configured to determine an eye position of an eye of the user wearing the HMD; and
   memory including instructions that, when executed by the processor, cause the processor to:
      determine, for one or more frames of the virtual scene, a viewing angle for the eye of the user based on the determined eye position;
      determine a gaze point of the user within the virtual scene based at least in part on the determined viewing angle and the determined eye position of the user;
      determine, using depth information for the virtual scene, a focus state for the optics block of a plurality of different possible focus states of the optics block based on the determined gaze point for the eye of the user;
      identify an optical correction for the determined viewing angle and the determined focus state for the optics block, the optical correction corresponding to the one or more frames of the virtual scene being displayed on the electronic display with pre-distortion that is canceled by one or more optical imperfections of the optics block as light for the one or more frames of the virtual scene with the pre-distortion passes through the optics block; and
      provide the one or more frames of the virtual scene for display on the electronic display with the determined optical correction.

8. The HMD of claim 7, wherein the one or more optical imperfections of the optics block cause one or more known optical aberrations as the light from the electronic display passes through the optics block to the exit pupil of the HMD.

9. The HMD of claim 7, further comprising:
a varifocal actuation block configured to change a focal length of the optics block based at least in part on a gaze point of the user and, wherein the instructions that, when executed by the at least one processor, further cause the at least one processor to:
adjust the focal length of the optics block based on the determined focus state using the varifocal actuation block.

10. The HMD of claim 7, wherein each focus state of the plurality of different possible focus states of the optics block is mapped to an optical correction corresponding to the one or more frames of the virtual scene being displayed on the electronic display with a pre-distortion that is canceled by one or more optical imperfections of the optics block for that focus state of the optics block as light for the one or more frames of the virtual scene with the pre-distortion passes through the optics block.

11. The HMD of claim 8, wherein the one or more optical aberrations include at least one of field curvature or chromatic aberration.

12. A non-transitory computer-readable storage medium including instructions, that when executed by a processor, causes the processor to:
determine, by a head-mounted display (HMD), a position and orientation of the HMD worn by a user viewing content displayed by the HMD, the HMD directing light from an electronic display presenting the content to an exit pupil of the HMD via an optics block;
identify, for a frame of the content, an image for rendering based on the determined position and orientation of the HMD;
determine, for one or more frames of the virtual scene, an eye position of an eye of the user wearing the HMD;
determine a viewing angle for the eye of the user based on the determined eye position, one or more viewing angles being associated with different optical aberration information corresponding to one or more known optical aberrations caused by the optics block, one or more optical imperfections of the optics block causing the one or more known optical aberrations as the light from the electronic display passes through the optics block to the exit pupil of the HMD;
determine a gaze point of the user within the virtual scene based at least in part on the determined viewing angle of the user;
determine, using depth information for the virtual scene, a focus state for the optics block of a plurality of different possible focus states of the optics block based on the determined gaze point for the eye of the user and the optical aberration information for the determined viewing angle, the depth information for the virtual scene providing a focus depth for the gaze point;
determine an optical correction of a plurality of optical corrections for the determined optical aberration information at the determined viewing angle, the optical correction corresponding to displaying the one or more frames of the virtual scene on the electronic display with pre-distortion that is canceled by the one or more optical imperfections of the optics block as light for the one or more frames of the virtual scene passes through the optics block; and
provide, for the determined optical aberration information at the determined viewing angle and determined eye position of the user wearing the HMD, the one or more frames of the virtual scene for display with the determined optical correction.

13. The non-transitory computer-readable storage medium of claim 12, wherein the instructions, that when executed by the processor, further cause the processor to:
track each eye of the user to an updated position for an additional image of an additional frame of the content;
determine updated optical aberration information for the updated position of each eye of the user;
select an updated focus state for the updated position of each eye of the user relative to the exit pupil from the focus state; and
provide the additional image for focusing to the exit pupil by the optics block for the updated focus state.

14. The non-transitory computer-readable storage medium of claim 12, wherein each of the one or more viewing angles is mapped to an optical correction of the plurality of optical corrections.

15. The non-transitory computer-readable storage medium of claim 12, wherein the instructions, that when executed by the processor, further cause the processor to:
adjust a focal length of the optics block based on the determined focus state using a varifocal actuation block, the focus state corresponding to a combination of the focus depth and the viewing angle.

16. The non-transitory computer-readable storage medium of claim 15, wherein adjusting the focal length includes changing a distance between the optics block and the electronic display using the varifocal actuation block to provide accommodation for the eye of the user for the determined focus state.

17. The non-transitory computer-readable storage medium of claim 15, wherein the varifocal actuation block is configured to change the focal length of the optics block by changing a shape or an optical path length of a lens included in the optics block to provide accommodation for the eye of the user for the determined focus state.

18. The non-transitory computer-readable storage medium of claim 17, wherein changing the shape or the optical path length of the lens of the optics block includes using at least one selected from a group consisting of: a shape-changing polymer lens, a liquid lens and electrowetting, an Alvarez-Lohmann lens, a deformable membrane mirror, a liquid crystal (electroactive) lens, a phase-only spatial light modulator (SLM), and any combination thereof.

* * * * *